US005303732A

United States Patent [19]

Jonsson

[11] Patent Number: 5,303,732

[45] Date of Patent: Apr. 19, 1994

[54] VALVE UNIT

[75] Inventor: Claes Jonsson, Björklinge, Sweden

[73] Assignee: Ekolag AB, Bjorklinge, Sweden

[21] Appl. No.: 69,505

[22] Filed: Jun. 1, 1993

[51] Int. Cl.[5] .......................... B67B 7/48; F16K 51/00

[52] U.S. Cl. .......................................... 137/318; 222/5; 222/83; 383/202

[58] Field of Search ................. 137/318; 222/3, 5, 83, 222/83.5; 383/202

[56] References Cited

U.S. PATENT DOCUMENTS

| | | | |
|---|---|---|---|
| 1,585,695 | 5/1926 | Schroeder | 222/5 |
| 2,249,796 | 7/1941 | Thoms | 222/5 |
| 2,741,319 | 4/1956 | Mickelsen | 222/5 |
| 3,308,990 | 3/1967 | Klasson et al. | 222/5 |
| 3,343,724 | 9/1967 | Malpas | 137/318 |
| 3,460,715 | 8/1969 | Lane | 137/318 |
| 3,767,227 | 10/1973 | Furusho et al. | 222/5 |
| 4,322,018 | 3/1982 | Rutter | 222/83 |
| 4,694,850 | 9/1987 | Fumino | 137/318 |
| 5,103,865 | 4/1992 | Hyde | 137/318 |
| 5,234,015 | 8/1993 | Fumino | 222/83 |

FOREIGN PATENT DOCUMENTS

| | | | |
|---|---|---|---|
| 960123 | 6/1964 | United Kingdom | 137/318 |

*Primary Examiner*—George L. Walton

*Attorney, Agent, or Firm*—Young & Thompson

[57] ABSTRACT

Valve unit (1) intended for puncturing a film (P), especially a plastic film, thereby creating a tight leadthrough through the plastic film (P), which valve unit (1) comprises a first member (2) for puncturing the plastic film (P), which first member (2) has a hollow space (5*a*) and at least one opening (5) leading through between the outside of the first member (2) and said hollow space (5*a*), and further a second member (3), which is intended to be positioned on the side of the plastic film (P), which is opposite to the first member (2) when the valve unit (1) is attached to a plastic film (P), said hollow space (5*a*) being in open connection with the surrounding atmosphere through the second member (3), a groove (7) extending around the circumference in the area between the first and the second members (2,3) being disposed to receive the edge portion of the plastic film (P) around the valve unit (1), which has been pricked through the plastic film (P), and an annular, resilient element (12) being displaceable from a retracted position to a position, in which it is in close contact with the edge portion of the plastic film (P) at the groove (7) pressing this to a mechanical detainment and a sealing fit-up against the edge portion of the groove (7), characterized in that the second member (3) comprises a release valve with a nonreturn function.

20 Claims, 3 Drawing Sheets

VALVE UNIT

Figure 1:
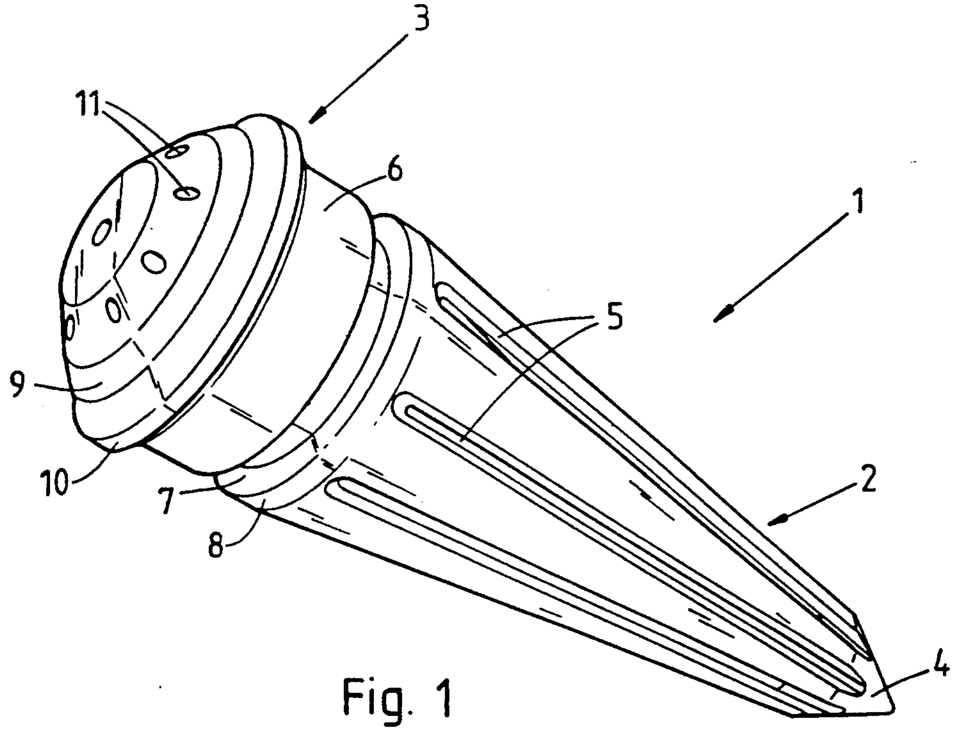

The present invention relates to a valve unit intended primarily for use for providing a release of the gas pressure, which is generated in sealed packages containing biomass. The valve unit is designed to permit its pricking through the protective material, usually a plastic film, surrounding a quantity of biomass, as well as its hermetical attachment to the plastic film providing a lead-through therethrough.

The valve unit of the invention can also be used for connecting various types of equipment with packages, which contain bulk material, e.g. biomass, and which are provided with a surrounding plastic film of one or more layer(s). It will now, however, be described in an embodiment, in which a nonreturn valve is connected directly to such a package, this being the main application of the invention.

In the described embodiment, the valve mechanism constitutes an integrated element of the valve unit with its connection device. The valve mechanism is thereby a release valve of nonreturn valve type permitting a release of the overpressure, which always, for different reasons, is present in packages containing biomass, e.g. grass, grain or the like. In this case the valve is also so designed, as to permit sampling and exchange of the atmosphere or gas in the packages.

A technique for storing damp biomass, which has been known for a long time, comprises ensiling in silos. This type of storage of biomass, which primarily is intended as food for livestock, calls for special measures concerning the handling of the biomass and for particular building structures for the storage of the biomass. This implies that the biomass stored in this way will be relatively expensive.

In order to reduce the cost of this handling, there has been, in recent years, an increased practice of packing the biomass, e.g. the cut fodder, in large bales out on the field in connection with harvesting and of wrapping these bales in plastic film, either in the form of bags or in the form of a length of material, which is wrapped around a certain amount of biomass. Biomass, which is packed in this manner, does not require storage in particular building structures, but may be stored openly out in the fields. In order to provide a regular storage, it is in this connection essential, that the biomass, e.g. the fodder is tightly enveloped, i.e. that there must not be any supply of air whatsoever allowed thereto. Besides ensiling, the so called airtight storage in large, tight bags according to systems similar to the one mentioned above with the same or even higher requirements for storage in absence of oxygen is used for half dry crops, usually grain. Compared to earlier methods of storage and ensiling, these are substantially less expensive and furthermore directly adaptable to the amount of biomass, which has been harvested.

In this type of biomass storage, it is thus necessary that the environment inside the packages is as free from oxygen as possible in order to avoid undesired biological processes in the form of mould fungi and the like developing in the biomass and leading to its destruction. Even though the plastic material used is comparatively tight, it can not be guaranteed that a pointed straw, a stone or some other object will not be able to cause some minor damage in the plastic material. The result will then be that air containing oxygen will be "pumped" into the package through the damage, i.e. as a result of changes in the air pressure. Hereby, there will be a substantial risk of the abovementioned problem with mould fungi and the like occurring in the biomass.

In the ensiling process, gas is produced, which either expands the film envelope, which in turn causes a great risk of the wind working it loose, or finds its way out through weakenings and leaks leading to a great risk of oxygen entering upon future meteorological variations.

It has further been shown, that the pressure condition and/or the gas composition inside such packages constitute an indication of the quality of the biomass in the package. By sampling this gas it will thus be possible to obtain valuable information about the storage conditions of the enclosed biomass.

To the extent that sampling of the gas inside the biomass package is made today, it is performed by making a hole in the plastic material of the package, in which the sample will be taken, through which hole a gas sample is extracted according to conventional methods. Once the sample has been taken, the hole made is stopped up by means of a suitable adhesive tape. Should it, however, be damp in the area surrounding the hole, the tape will not stick securely, and should there be minor folds in the film surrounding the hole made, problems may occur concerning the adhesion of the tape as well as the tightness. In both cases air penetration may occur to a greater or lesser degree, leading to oxygen entering the package.

A further problem of today concerning the film packages containing biomass is that it is impossible under ordinary conditions to evaluate the quality of the preservation and the state of the biomass until the package is opened for its final consumption, e.g. for feeding of animals.

Yet another problem of today concerning the film packages containing biomass relates to its handling, e.g. their removal without damaging the film. In cases, where packages are left lying around in the field until the time of consumption of the contents, a transportation damage occurring during the transportation from the field to the location of the consumption will be of minor importance only. Should it however be desired to move the packages to a particular storage location, e.g. a particular area, a barn or the like, it will be essential to prevent any damages, which may ruin i oxygen-free environment in the packages during the continued storage period.

The present invention aims at clearing the abovementioned problems away. This aim is achieved through a device of the kind specified in the claims, which also disclose the specific features, which characterize the invention.

Figure 2:
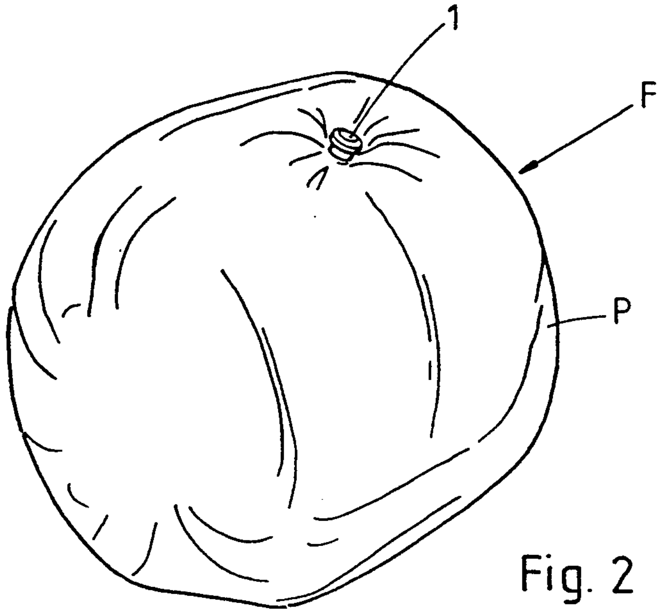
Figure 3:
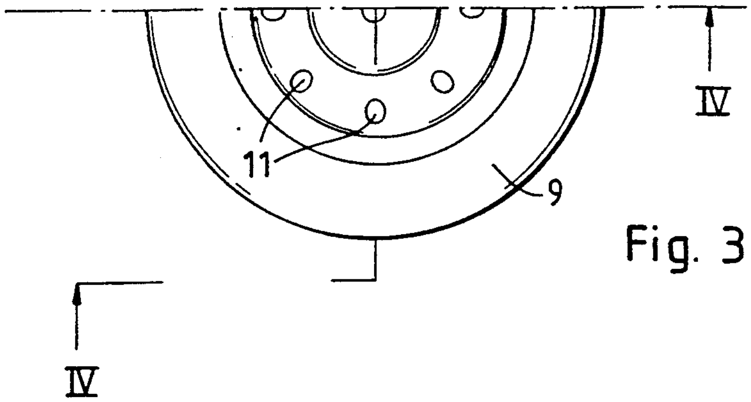
Figure 4:
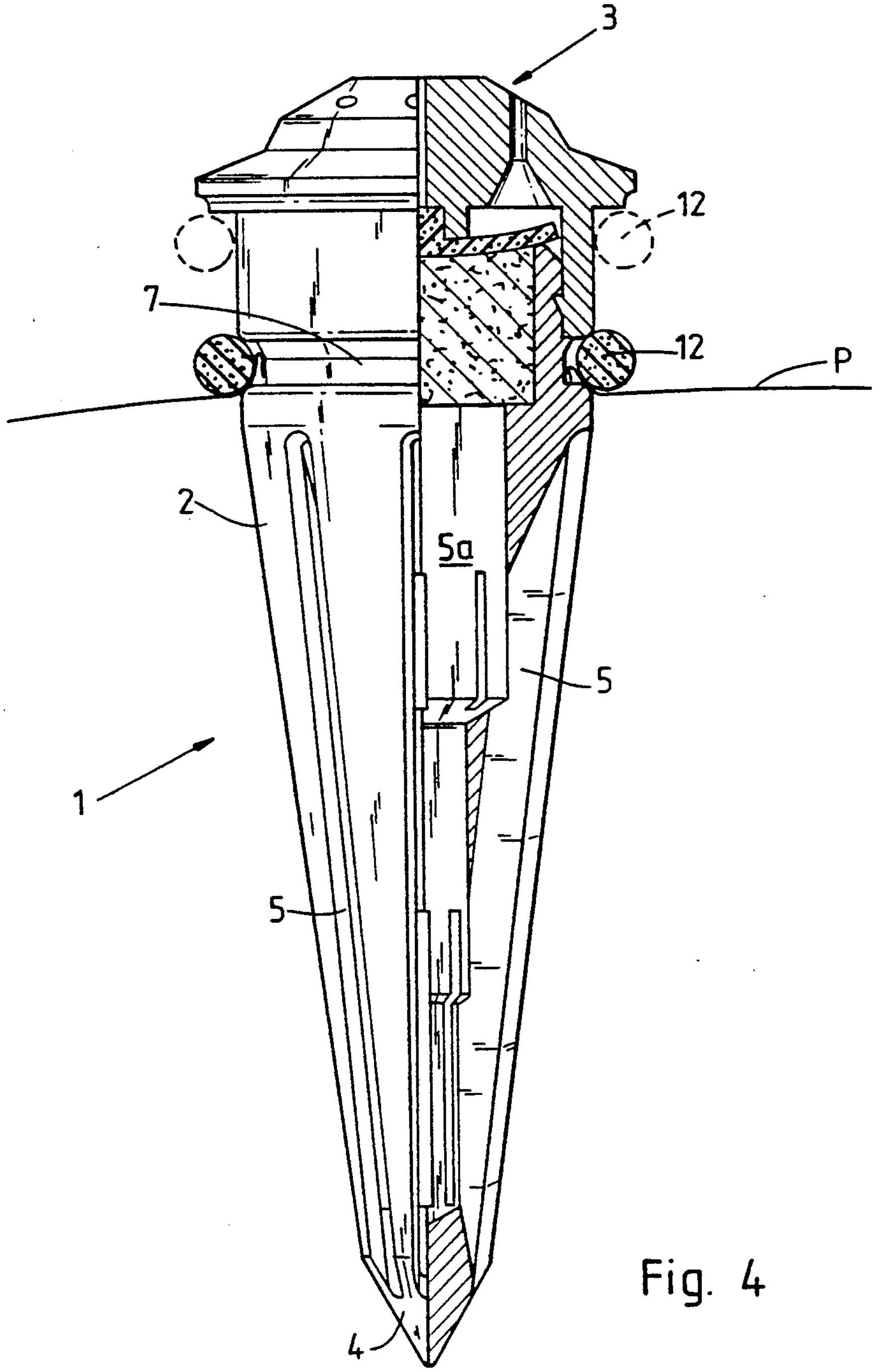
Figure 5:
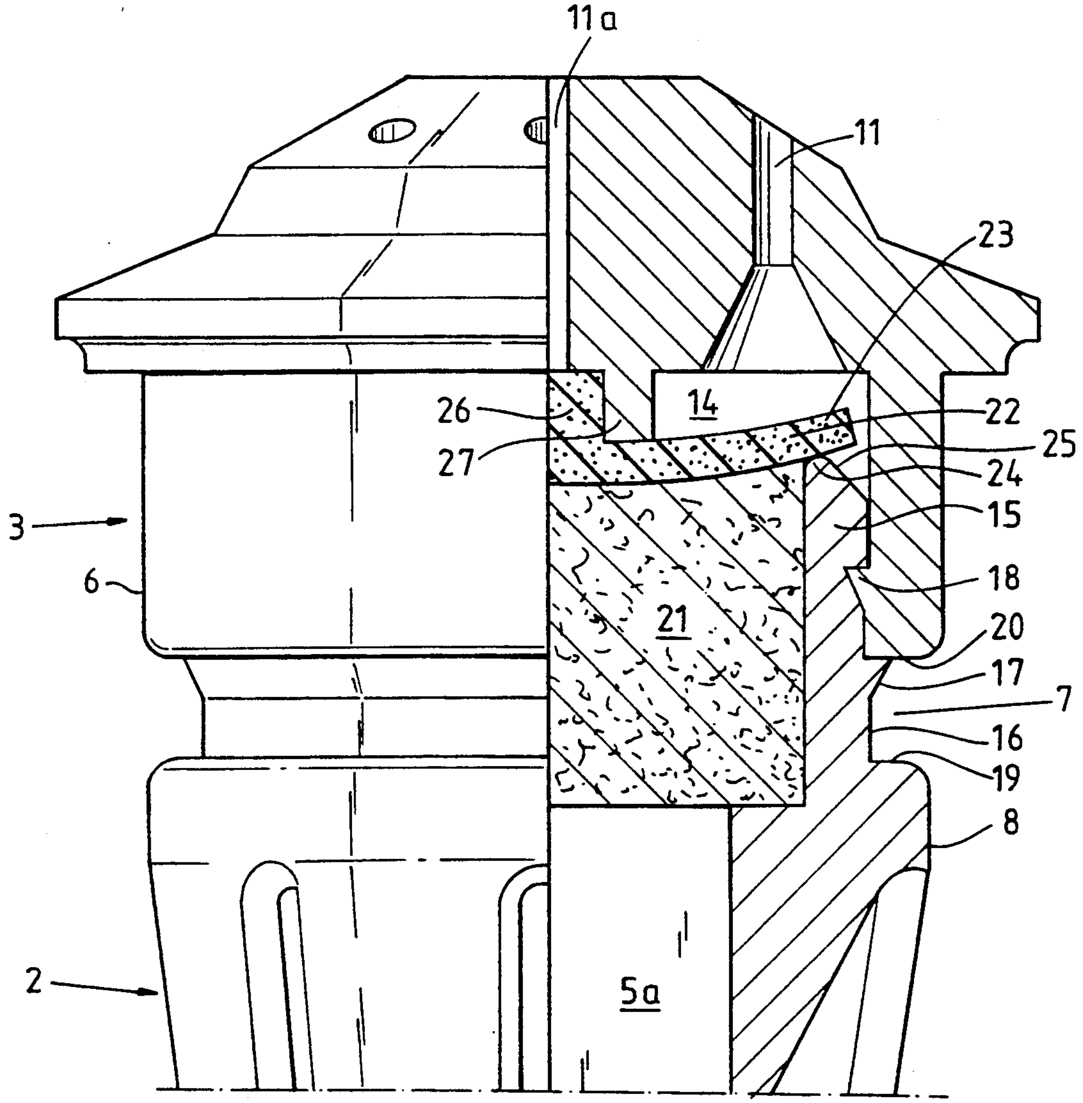

The invention will now be described in connection with the appended drawings, in which FIG. 1 is a perspective view of a valve unit according to the invention comprising a release valve, FIG. 2 is a perspective view of a valve unit according to the invention comprising a release valve and attached to a package containing biomass, FIG. 3 is a partial plan view of the valve unit of FIG. 1, FIG. 4 is a partly cut view of the valve unit of FIG. 1 made substantially along the line IV—IV in FIG. 3, and FIG. 5 is an enlarged, partly cut view of the valve device of FIG. 4.

The valve unit of FIG. 1 consists basically of a conically shaped body 2, which, in the embodiment shown, is provided with a valve housing 3 at the base end of the conically shaped body 2. The valve housing may be substituted by, e.g., connection means for connection of hoses or other equipment, self-closing membranes, through which its possible to run a cannula or the like. At the end opposing the base end, the body 2 is provided with a tip 4 having a cone angle that departs from the rest of the body 2.

In the body 2, being manufactured as a piece of plastics in the embodiment shown, a set of openings 5 leading through to a hollow space 5*a* inside the body 2 are disposed, which openings 5 are in the form of longitudinal slits with chamfered edges. This shape of the openings 5 is suitable, whenever a low speed of flow of the gas flowing therethrough is desirable. Such a shape is also suitable to avoid choking up of the flow path of the gas due to dust and particles conveyed from the biomass. They must however present a surface area large enough to permit gas flow at low pressures without hindrance.

The valve housing 3 is provided with a cylindrical portion 6 of circular cross section adjacent to the conical body 2. This portion 6 is however separated from the conical body 2 through a groove 7 extending around the circumference, the conical body 2 adjacent to the groove 7 being provided with a short cylindrical portion 8 of circular cross section. The two cylindrical portions 6 and 8 are suitably, however not necessarily, of the same diameter. At the free end opposing the body 2, the valve housing 3 is terminated by a cap-like portion 9 having a circular edge 10, which protrudes from the cylindrical portion 6. The cap portion 9 is provided with through-holes 11 leading to the inside of the valve housing 3 and allowing gas passage from that place to the surrounding atmosphere.

FIG. 2 shows the way a valve unit 1 of the invention is inserted through a plastic film p to a package F containing biomass, the valve unit 1 providing an airtight fit-up to the plastic film P. The plastic film P may thereby be in the form of a plastic bag as well as a length of film, which has been wrapped in several layers around a quantity of biomass. The invention does not in itself require a film consisting of plastics as such, but, on the contrary, the invention can be practiced with any type of plastic, reinforced as well as unreinforced, which dispose some elasticity.

FIG. 3 shows principally only the way the cut view of FIG. 4 has been taken, as well as a portion of the cap-like portion 9 and the through-holes 11.

FIG. 4 shows the way a valve unit 1 comprising a release valve is attached to the plastic film P of a package of biomass not illustrated in detail. Thus, the conical body 2 of the valve unit 1 is pricked through the plastic film P, the tip 4 having facilitated the running of the conical body 2 through the plastic film. The plastic film p is comparatively tough and extends elastically around the conical body 2. As soon as the edge of the plastic film around the body 2 during the insertion has reached the groove 7, it will contract into this groove 7. In the initial position, i.e. during the insertion, a ring 12 of rubber or other resilient material is disposed adjacent to the cap-like portion 9, as shown with dashed lines. When the edge of the plastic film has penetrated into the groove 7, this ring 12 is rolled manually from its position adjacent to the cap-like portion to the groove 7, into which it partially penetrates, locking the plastic film P, which has been forced thereinto. Since the ring 12 presses against the edges of the groove 7, which give a line contact against the ring 12, this will result in high pressure between the ring and these edges as well as against the jammed plastic film, thereby providing not only a dependable securing of the plastic film but also a powerful sealing, which prevents air communicating between the inside of the package F and the surrounding atmosphere. Even if there should exist minor folds on the edge of the plastic film in the groove 7, the sealing pressure from the ring 12 will still be appropriate to provide gastight conditions.

FIG. 4 further shows that the openings or grooves 5 extend inwardly to a hollow space 5*a* in the conical body 2. In the shown embodiment, this hollow space 5*a* has a step design for reasons of manufacturing technique. The shape of this hollow space 5*a* is however of no importance. Also the valve housing 3 is provided with a hollow space 14, see FIG. 5, in direct connection with the hollow space 5*a* in the conical body 2.

As FIG. 5 shows, in order to provide the valve housing 3 itself, the conical end 2 is provided at its base end, with an axially protruding, circular wall 15, the side facing radially inwards of which provides a wall at the valve housing 3 and the side 16 facing outwards of which constitutes the inner wall in the groove 7. The cylindrical portion 6 of the valve housing 3 also comprises a circular wall, which is extended axially from the cap-like portion 9 and which is threaded with a tight fit onto the circular wall 15 of the conical body 2. The circular wall 15 is provided with a radially protruding ridge 17, which limits the axial displacement of the circular wall 6 along the circular wall 15. In order to prevent the valve housing 3 and the conical body 2 from parting unintentionally, a locking arrangement 18 with a groove and a projection is provided respectively on the opposing sides of the walls 6 and 15. As an alternative or as a complement, the elements may be locked to one another through gluing or some other method.

The groove 7 is inwardly limited by said side 16, downwardly by the shoulder 19 between the cylindrical portion 8 of the conical body 2 and the side 16, and upwardly by the lower terminal edge 20 of the wall 6. Inside the valve housing 3 in a portion of its hollow space 14 and inside the wall 15 a filter 21 is preferably disposed, which prevents the passage of contaminants from the hollow space 13 inside the conical body 2 to the external air, which contaminants could have a negative influence on the closing function of the valve.

A circular valve disk 22 of a flexible material is disposed above the filter 21 in a manner such that its outer portion 23 at its circumferential edge rests sealingly against the circular, axial terminal edge 24 of the wall , which, in the shown embodiment, has been made relatively narrow through a chamfering 25 of the portion, which is facing radially outwards. In another, unillustrated embodiment, the outer portion of the valve disk rests against a smooth, annular surface, which slopes downwards-inwards.

In its center, the valve disk 22 is provided with a head 26, which is received with precision fit inside a circular wall or ridge 27 in the form of a ring. The axial distance between the outer edge of the circular ridge 27 and the terminal edge 24 of the wall is preferably less than the thickness of the valve disk 22, making this through its resiliency, as FIG. 5 shows, biased towards the closing position. Of course, the valve disk 22 may have an attachment and bias of another kind as well. The important thing is that the valve opens in response to low gas pressures, while at the same time closing safely in its nonreturn valve function. The valve disk 22 is also supported largely by the filter 21, against which it rests. Eventually, a perforated disk can be disposed between the valve disk 22 and the filter 21 in order to keep the filter 21 uninfluenced by the valve disk 22.

The overpressure, which is present or is generated inside the package F for different reasons, which have been mentioned in the introduction, flows out through the attached valve unit 1 and its release valve to the surrounding air. Since the openings 5 are large enough not to obstruct gas flow and since the filter 21 is extremely porous, no substantial counter pressure is generated in the flow path until the valve disk 22, which requires a certain pressure in order to permit opening. This pressure lies, however, far below the pressures, that may be present in the package F, e.g. those generated by various processes in the biomass of the package.

It is obvious from the shown embodiment of the valve mechanism that the central hole 11*a* in the cap portion 9 extends down to the head 26 of the valve disk 22. Should it be desired to sample the atmosphere inside a package F, a cannula will be run through the hole 11*a* and through the head 26. The gas in the package F may then be exhausted through the cannula by suction and be conducted to a suitable analysis or collecting equipment. The material in the valve disk 22 and in its head 26 is such, that the perforation of the cannula seals itself to provide absolute tightness once the cannula has been removed.

It is also possible to put the package F under a certain underpressure through the valve unit 1. It is then possible to obtain an indication of the leakiness of the package through taking a reading of the pressure change, i.e. the pressure increase from this defined underpressure, in the package under a certain period of time. Empirically, the pressure change can also provide an indirect indication of the quality of the biomass inside the package.

The gas generated by the biomass does not contain any oxygen. Thereby, it is possible to obtain the conditions in the package F, which are preserving to the biomass in the package as long as this is completely tight. In order to speed up the effecting of such a preserving condition in a package, it is possible to exhaust the air enclosed in the package at the wrapping of the biomass by suction through the valve unit 1, so as to then either leave the package by itself until a spontaneous gas generation is brought about therein or to insert some suitable inert gas.

The invention further permits mechanical handling of the packages in a way that reduces the risk of handling damage to a minimum. Such mechanical handling means that the packages are gripped by means of suction cups in order to be, e.g., lifted or moved away. A suction cup is placed on the package F on top of the valve unit 1. When the suction cup is put under underpressure, the air/gas in the package will evacuate through the valve unit 1 with its valve, and when thereby e.g. lifting, the suction cup will not only grasp the package F in itself where the suction cup is applied, but the lifting force will be distributed over the entire package, implying a lift, which means less stress to the plastic film and thus a safer lift. This also means that an evacuation of the gas inside the package F takes place, this being positive as oxygen possibly present therein will be removed.

The valve mechanism included in the valve unit 1 of the present invention can of course undergo numerous variations regarding both form and function. It is thus possible to design the valve mechanism in different ways. The fundamental thing is, however, that it constitutes a nonreturn valve, which permits the flowing out of the atmosphere inside a package to the surrounding air, and that it opens to unload already at very small differences in pressure. It is further desirable that it comprise a membrane or the like, through which a cannula or the like can be run through for e.g. sampling of gas, and which is self-sealing upon the removal thereof. In the same way, the purely conical shape of the body 2 itself is not necessary even though it is preferable. It is essential that the body 2 is convenient to run through a plastic film and that it is securable thereto in a tight, safe and easy way. In a possible embodiment the body 2 is made in perforated, stainless steel, which has been formed into a cone.

As mentioned, the valve unit 1 may have different designs, depending of the use, in the portion lying outside the attachment to the plastic film. It must then be taken into consideration that the valve unit is tightly attachable to all conventionally existing plastic films, irrespective of whether the plastic film is included in a package or in something else. The valve unit 1 may thus be provided with an integrated hose connection, a perforable membrane, a pressure gauge, a gas analyzer or other equipment. The nonreturn valve can obviously also function to permit gas admission into the package but to prevent the letting out of gas therefrom, e.g. in the case, where it for any reason is desirable to maintain a particular gas and/or a defined pressure inside a package.

As has been shown above, the objects of the invention set forth in the introduction have been achieved as have many other advantages. The mentioned variations as well as other possible variations of the invention are however intended to lie within the scope of the invention, as this is defined in the appended claims.

I claim:

1. Valve unit (1) intended for puncturing a film (P), especially a plastic film, thereby creating a tight leadthrough through the plastic film (P), which valve unit (1) comprises a first member (2) for puncturing the plastic film (P), which first member (2) has a hollow space (5*a*) and at least one opening (5) leading through between the outside of the first member (2) and said hollow space (5*a*), and further a second member (3), which is intended to be positioned on the side of the plastic film (P), which is opposite to the first member (2) when the valve unit (1) is attached to a plastic film (P), said second member being removably secured to said first member to provide a single unit for insertion into said film, said hollow space (5*a*) being in open connection with the surrounding atmosphere through the second member (3), a groove (7) extending around the circumference in the area between the first and the second members (2, 3) being disposed to receive the edge portion of the plastic film (P) around the valve unit (1), which has been pricked through the plastic film (P), and an annular, resilient element (12) being displaceable from a retracted position to a position, in which it is in close contact with the edge portion of the plastic film (P) at the groove (7) pressing this to a mechanical detainment and a sealing fit-up against the edge portion of the groove (7), said second member engaging said resilient element to hold said resilient element in said groove and against said film to provide said sealing, characterized in that the second member (3) comprises a release valve for release of overpressure and having a nonreturn function, said release valve being positioned in said second member in such a manner as to seat on an upper portion of said first member when said first member and said second member are secured together.

2. Valve unit according to claim 1, characterized in that the release valve comprises a circular valve disk (22), the central portion of which is in the form of a self-closing perforable membrane (26), and the circumferential edge of which rests against an axial terminal edge (24) of a surrounding wall (15), which terminal edge (24) functions as a valve seat.

3. Valve unit according to claim 2, characterized in that the openings (5) through the first member (2) are in the form of slits provided with chamfered edges at the envelope surface of the first member (2).

4. Valve unit according to claim 2, characterized in that the second member (3) is in the form of a connection element.

5. Valve unit according to claim 2, characterized in that the first member (2) and the second member (3) are provided with snap-in engagement means (18) to permit the parting of the members (2, 3) from one another.

6. Valve unit according to claim 2, characterized in that it is possible to place a suction cup in connection with a handling device on top of the valve unit (1) for securing the package (F) by suction to the suction cup, underpressure being generated also inside the package (F), in and for the handling e.g. the lifting up of the package (F).

7. Valve unit according to claim 2, characterized in that the valve disk (22) is biased to a fit-up against the terminal edge (24) functioning as a valve seat.

8. Valve unit according to claim 7, characterized in that the openings (5) through the first member (2) are in the form of slits provided with chamfered edges at the envelope surface of the first member (2).

9. Valve unit according to claim 7, characterized in that the second member (3) is in the form of a connection element.

10. Valve unit according to claim 7, characterized in that the first member (2) and the second member (3) are provided with snap-in engagement means (18) to permit the parting of the members (2, 3) from one another.

11. Valve unit according to claim 7, characterized in that it is possible to place a suction cup in connection with a handling device on top of the valve unit (1) for securing the package (F) by suction to the suction cup, underpressure being generated also inside the package (F), in and for the handling, e.g. the lifting up of the package (F).

12. Valve unit according to claim 1, characterized in that the openings (5) through the first member (2) are in the form of slits provided with chamfered edges at the envelope surface of the first member (2).

13. Valve unit according to claim 12, characterized in that the second member (3) is in the form of a connection element.

14. Valve unit according to claim 12, characterized in that the first member (2) and the second member (3) are provided with snap-in engagement means (18) to permit the parting of the members (2, 3) from one another.

15. Valve unit according to claim 12, characterized in that it is possible to place a suction cup in connection with a handling device on top of the valve unit (1) for securing the package (F) by suction to the suction cup, underpressure being generated also inside the package (F), in and for the handling, e.g. the lifting up of the package (F).

16. Valve unit according to claim 1, characterized in that the second member (3) is in the form of a connection element.

17. Valve unit according to claim 16, characterized in that the first member (2) and the second member (3) are provided with snap-in engagement means (18) to permit the parting of the members (2, 3) from one another.

18. Valve unit according to claim 16, characterized in that it is possible to place a section cup in connection with a handling device on top of the valve unit (1) for securing the package (F) by suction to the suction cup, underpressure being generated also inside the package (F), in and for the handling, e.g. the lifting up of the package (F).

19. Valve unit according to claim 1, characterized in that the first member (2) and the second member (3) are provided with snap-in engagement means (18) to permit the parting of the members (2, 3) from one another.

20. Valve unit according to claim 1, characterized in that it is possible to place a suction cup in connection with a handling device on top of the valve unit (1) for securing the package (F) by suction to the suction cup, underpressure being generated also inside the package (F), in and for the handling, e.g. the lifting up of the package (F).

* * * * *